Patented June 2, 1942

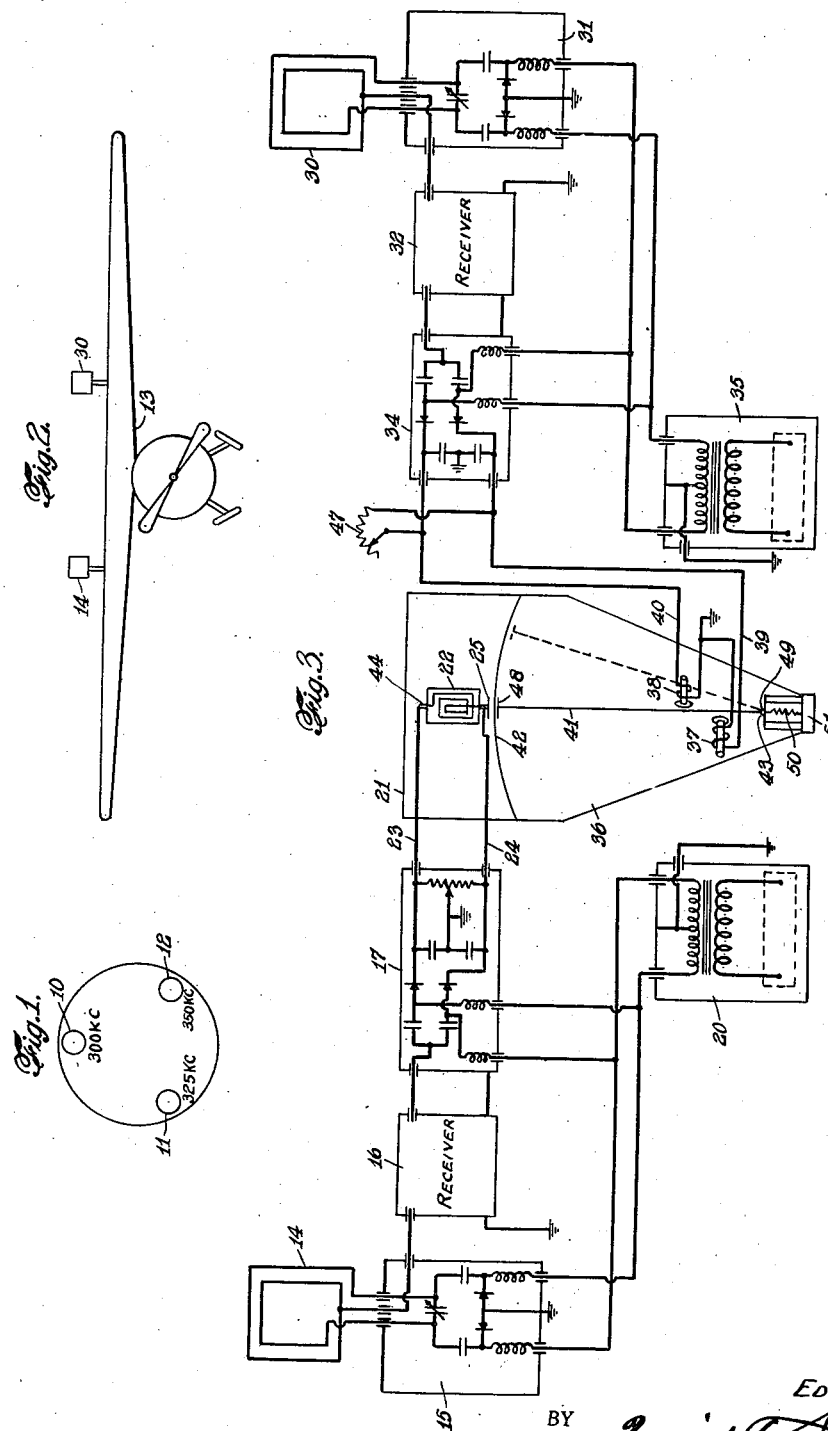

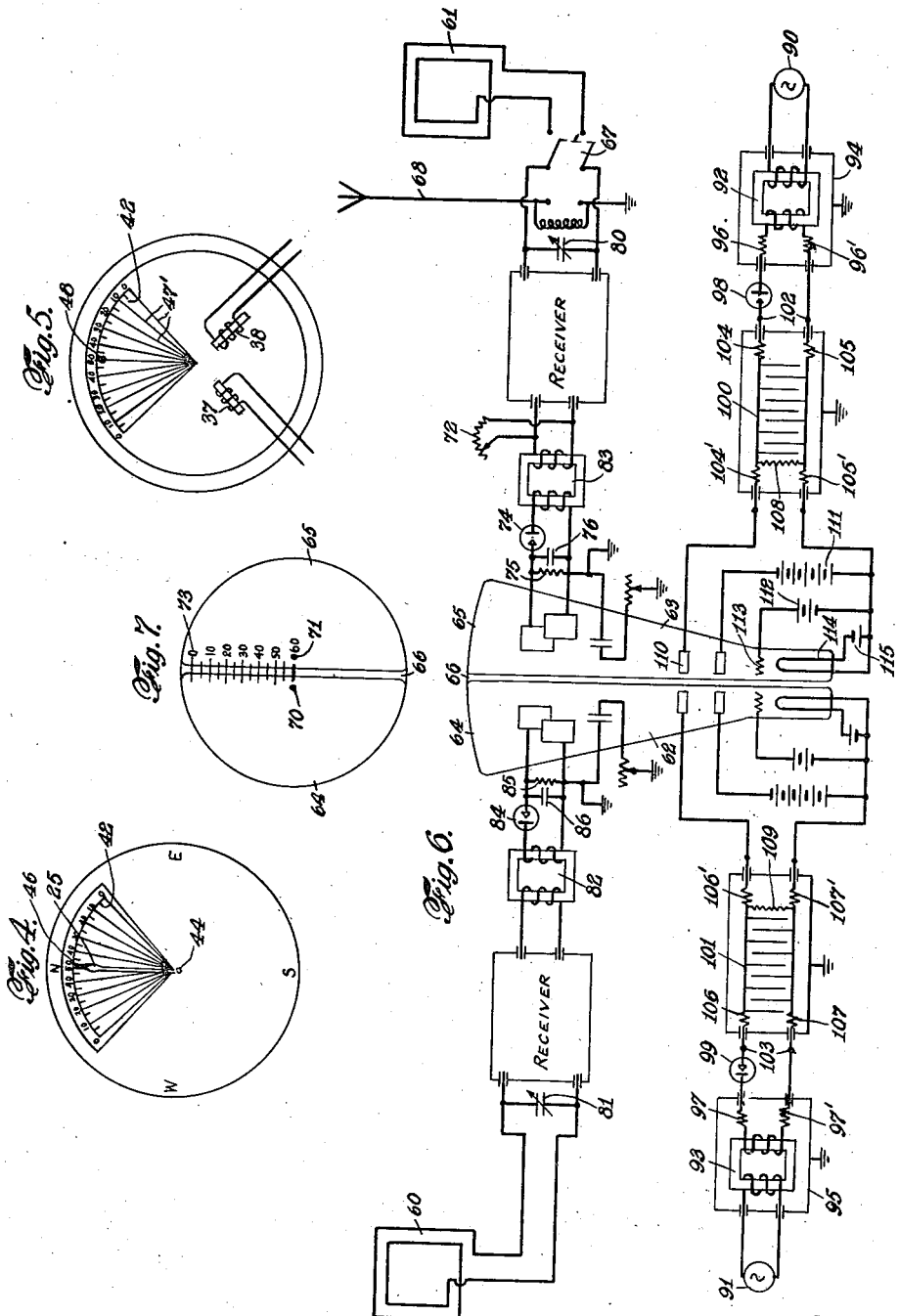

2,284,812

UNITED STATES PATENT OFFICE 2,284,812

RADIANT ENERGY DISTANCE DETERMINING SYSTEM

Edward G. Gage, Brooklyn, N. Y., assignor, by direct and mesne assignments, of two-thirds to Leon Ottinger, New York, N. Y.

Application November 2, 1939, Serial No. 302,523

6 Claims. (Cl. 250—11)

The invention relates to improvements in a system for determining instantly by radiant energy the distance and direction of a mobile unit from a group of radio beacons, as described in my co-pending U. S. patent application Serial No. 281,511, filed June 28, 1939, Patent No. 2,255,659, dated September 9, 1941.

In the aforesaid application I have shown a mobile receiving unit such as an airplane on which are mounted four direction-finding loops. Two of these loops are mounted on top of the plane at an angle to each other, and two are mounted at the bottom of the plane, also at an angle to each other, the two top loops supplying energy to the input of respective radio receivers. The output from each of these receivers supplies energy to corresponding solenoids acting differentially on a single needle. Similarly, the bottom pair of loops controls a second needle operatively associated with a scale graduated for distance. A common horizontal calibrated scale is used and both needles move over this scale, one above and the other below. The angle formed by the two needles affords means for indicating the distance, one needle acting as a reference point and the other indicating the distance by the scale graduations.

In my present invention as described herein, I eliminate the necessity for two pairs of loops by combining two of the loops in the same plane, and causing each loop portion to function differently by alternately rendering a loop portion non-directional by grounding it as in the well-known split-loop, right-left indicator or "homing compass." By using two such direction-finder systems in combination and causing the output meter needle of each system to move over a common scale, it is possible to produce a more easily readable distance indicator and at the same time dispense with two separate loops.

The invention has for an object to reduce the number of loops and consequently their wind drag on the plane.

Another object is to reduce the number of receivers necessary to supply directional energy to the output meters of the system.

Still another object is to provide a safety circuit in connection with a cathode ray indicator to prevent dangerous shock to the operator from high voltages, when this indicator is used in place of an output meter.

A further object is to provide means for a cathode ray indicator viewing screen in which the indicating line is projected in a line from the center of the screen.

The invention has for an object, also, to provide a double meter with a common scale over which two independently moving indicating pointers move to indicate distance.

Another object is to provide a common calibrated scale for a double cathode ray viewing screen as an alternative to a meter having two independently moving indicating pointers.

In the practical application of my invention, I employ for output meter indication or cathode ray indication two receiving loops mounted in the same plane, and combined in a single casing. This is accomplished by grounding the center coil of the loop and using the two halves as separate loops. A single tuned receiver then combines the input currents with an audio oscillator in such manner as to alternately ground the terminals of one loop through rectifiers making the loop non-directional, while the other loop or half of the coil retains its direction-finding characteristics. As each loop differentially affects the indicating pointer by its output currents, the relative values of directional and non-directional reception serve to cause the needle to deflect to the right or left of a zero position on a scale.

The entire direction-finding receiving system for the "on course" or reference point indication is that which is commonly known as a "left-right indicator" or "homing compass," fully described in Bulletin No. 18, March 15, 1932, of the U. S. Department of Commerce; and I do not claim such apparatus except in combination.

The other unit of the combination is similar to the "on course" indicator except that a specially constructed output meter is used, with a special output circuit from the receiver.

It is well known that a "left-right" indicator will not accurately indicate direction except when the needle points to the center zero, in which case it accurately indicates a direction perpendicular to the received wave front.

In other words, the "left-right" indicator indicates "on course" or "off course," but not how much off course.

I have discovered, however, that with a special indicator moving in two planes instead of one, as in the case of the standard zero center meter, amplitude variations due to signal strength may be used to move the indicator in one plane, i. e. forward, and loop reception angle signal value be indicated by a movement of the indicator in another plane, i. e. right or left, without disturbing the forward direction of movement of the indicator.

By increasing or decreasing the amplification of the receiver until the "right-left" and forward indications coincide at the calibrated scale, the readings will automatically be the same at the same distance from the transmitter.

It is preferred that the pivots of the pointers be farthest from the transmitter as the scale is viewed from above when in a horizontal position. In this way the pointers seem to point at their respective transmitters and the angle between them narrows with distance. The fact that only one will point exactly at its transmitter is not of great importance.

The nature of the invention, however, will best be understood when described in connection with the accompanying drawings, in which:

Fig. 1 is a diagrammatic representation of a transmitter group.

Fig. 2 is an elevation of an airplane showing loops positioned thereon.

Fig. 3 is a schematic diagram of the improved distance and direction system employing a double output meter indicator, with differentially operated pointers.

Fig. 4 is a plan view of a novel indicating meter utilized in the system; and Fig. 5 is a similar view of a portion of the complete meter.

Fig. 6 is a schematic diagram of an alternative arrangement of the system and employing a double cathode ray viewing screen indicator with separately operated spots or indicators.

Fig. 7 is a plan view of the viewing screen utilized in the alternative system.

Referring to Fig. 1 of the drawings, 10, 11, and 12 indicate a triangle arrangement of radio beacon transmitters, of the modulated continuous wave type transmitting simultaneously, each on a different frequency, for example at 300, 325 and 350 kilocycles, respectively, as described in detail in my co-pending application for U. S. Letters Patent, Serial No. 281,511, the signals therefrom being received by a suitable receiving system located upon a movable vessel such as an airplane 13, Fig. 2, approaching the transmitters in a direction substantially at right angles to one side of the triangle. Thus, as shown in Fig. 3, there is set forth a system wherein 14 indicates a receiving direction-finding loop unit tuned to transmitter 11 and tapped in the center in the well-known manner of a homing compass or left-right directional receiving means and embodying the grounding rectifier unit 15, which alternately causes first one half of the loop unit and then the other half to become non-directional. The detector and amplifier unit 16 of the receiver, which has a linear characteristic, is connected thereto and includes also a rectifier grounding unit 17 of the output circuit, which alternately affects the direction of current flow through an output meter coil. A low audio-frequency unit 20 supplies an audio-frequency current to both input and output circuits, while 21 indicates the shell of an output meter comprising the armature coil 22 and the coil leads 23, 24, the indicating pointer being designated by the reference character 25.

Similarly, a second direction-finding loop 30 separated from and fixed in the same plane as loop 14, is provided, but the same is tuned to transmitter 12, Fig. 1. The grounding rectifier unit 31 connects with the detector and amplifier receiver unit 32; and a grounding rectifier unit 34 is provided for the output circuit as well as the low audio-frequency unit 35. A casing 36 houses a further output meter having the coils 37 and 38 to which are connected the coil leads 39 and 40, the coils operating an indicating pointer 41 over a calibrated scale 42 common to both indicating pointers 25 and 41 and provided on the transparent top of the said casing.

The indicating meter employed with the system is really a double meter, that is, two meters mounted face to face with the common scale 42 in back of each pointer. The pivot of the pointer 41 is indicated at 43 and is located directly beneath the pivot 44 of the pointer 25.

A reference line 46, on the scale 42 and preferably in a distinctive color, serves as the zero center of pointer 25 when the craft is "on course," no energy then being received to actuate the pointer 25. The position of pointer 25 over this reference line or zero center is to be maintained at all times by guiding the plane to point at beacon 11 until the reference line appears beneath the pointer.

The position of the pointer 41 ordinarily varies with the distance of the plane from the center of the beacon group 10, 11, 12, Fig. 1. At great distance or infinity, the tip of the pointer appears nearly beneath the pivot of pointer 25. At close range it appears near the edge of the scale. This would cause an ambiguity due to amplitude variation which would destroy accuracy.

To overcome this ambiguity, I provide the attenuator 47, Fig. 3, by which the amplification is increased or decreased until the pointer tip or indicator is always over some figure of the calibrated scale 42, Fig. 5, at the moment a reading is taken. Radial lines 47' serve as a rough guide for locating the indicator. It will be noticed that the calibrated scale reads in reverse from the reference point of the meter.

The loop controlling the indicator 41 is tuned to beacon 12, and the said indicator then indicates the amount of "off course" from this beacon in terms of miles. The constant "on course" indication of indicating pointer 25 maintains a predetermined reference line with which to compare the constantly changing position of indicator 41 with distance.

The direction of winding of the direction-finding loops is such that an indication of "right" for one meter produces an equivalent indication of "right" for the other meter, if the signal is from transmitters having the same location, or from transmitters having a different location when the distance approaches infinity.

It is important that the zero center figure and the pointer pivots be in line with the fore and aft points of the plane when the front meter face is horizontal. With the scale zero under one pointer, the plane will be pointing to, or on course in a line running between the plane and one transmitter of the triangle group such as set forth in my U. S. patent application Serial #281,511.

It will be noted that in Fig. 3 the circuits of the two sections of the system are practically the same but that the meters which act cooperatively are different. The front meter may be a standard sensitive micro-ammeter, but the meter beneath it is of special construction. However, the ordinary instrument, with pointer swinging either side of zero in a single plane parallel to the scale, cannot be used to indicate direction accurately when supplied with signal-energy from two loops because the amplitude of the signal shows a variation on the meter with distance and the result is confused with the pointing of the needle indicating direction. This difficulty is overcome by making the indicator pointer 41 in the form of a long light but stiff wire or vane, with a very small flat disc 48 at its tip as an indicator and a ball joint 49 or point suspension at the other end so that the pointer may deflect in two planes at right angles to each other. This wire may be made of steel and is held in a vertical position by a light spring 50 and a permanent magnet 51 opposite the ball joint which tends to hold the polarized wire pointer lightly in the vertical position and allows it to be deflected in any direction, always swinging from the point of suspension.

To deflect the wire, the two deflecting coils 37 and 38 similar to those used in cathode ray tubes are placed adjacent to the wire at right angles to each other, and near enough to the wire to allow it to be deflected thereby, the respective juxtaposed poles being of the same polarity, when energized, and which is the polarity of the pointer. The instrument is what might be termed a "mechanical cathode ray," since the light wire with the flat disc or "spot" on one end is similar to the beam, and the deflecting coils function much in the same way as a cathode ray tube with magnetic deflectors. A cathode ray tube may, of course, be substituted for the instrument when desirable.

One deflecting coil operates with positive current through one element of the rectifying unit 34 and the other coil with negative current through the other element of said rectifying unit. The wire or indicator has a moment of inertia too great to follow the frequency of the synchronizing unit or source of low-frequency which is usually 60 cycles, and consequently it remains in the center of the front scale 42 when no signal is being received. Upon receiving a signal from either half of a split loop, however, the indicator takes up a position with regard to the deflecting coils proportional to the current in either loop. As an example, if neither loop delivers any current, as would be the case when the loops are in the non-receptive position at right angles to the course, then the indicator remains in the center.

If both loops deliver the same amount of current to the deflecting coils, assuming the coils to be respectively vertical and horizontal deflectors, then the pull on the indicator will be in a direction midway between vertical and horizontal.

If one loop delivers signal energy to its deflecting coil and the other does not, then the indicator will take up a position either vertically or horizontally away from center, depending upon whether the vertical or horizontal deflector received the current.

The important feature of the instrument is that it is always operated by proportional current from the loops, and therefore the direction of its indications will always be due to the signal current resulting from the angle of the loops and not to the amplitude of their signals. The amplitude shows merely in the amount of swing of the indicator from center, and not in its direction.

The device then functions accurately as a direct indicating radio compass and is used in conjunction with the other "left-right" instrument, which registers "on course" from another beacon to determine distance by registering the amount of "off course" in terms of degrees calibrated in miles.

It is desirable that the zero or "on course" spot indication of the lower meter shall coincide with the "on course" pointer indication of the upper meter of the double indicating meter, and therefore the circular scale or screen is so placed that the spot, when indicating "on course," will be deflected equally by both deflectors in a forward direction, exactly in line with, and directly behind, the indicating pointer of the front meter. To effect this result, the lower meter is mounted with each deflecting coil at an angle of approximately 45° from the fore and aft axis of the plane.

An alternative means is shown in Fig. 6 and comprises two single loops 60 and 61 mounted in the same plane but preferably separated as much as possible, each loop supplying received energy to the input of a cathode ray indicator embodying two cathode ray tubes 62 and 63. Both of these tubes have semi-circular viewing screens 64 and 65 and are adjacently mounted to produce the effect of a circular viewing screen, the line between the two halves of the screen forming a common calibrated scale. This scale may conveniently be a narrow strip of metal 66 with the degrees of calibration running across from one edge to the center. A switch or button 67 is used to substitute momentarily the loop 61 for a non-directional antenna 68 or short antenna-ground system. The reading obtained from antenna 68 is used as a reference point and is adjusted until opposite the scale zero 73.

The length of the antenna 68 should preferably be such that it has the same reception sensitivity as the loop 61 when this loop is in a plane in line with the transmitter or in position of maximum reception. This being so, the loop reception will always be less than the antenna reception when the loop deviates from its maximum position. The amplifier system has a linear characteristic which allows the amplitude of the non-directional signal to be varied by the attenuator without destroying its relation to the amplitude of the directional signal.

Each viewing screen shows the characteristic cathode ray spot 70 and 71 close to the center of the calibrated scale 66, one on each side of the scale when no signals are being received.

Upon the reception of a signal from a group of beacon transmitters, the plane is guided until the left-hand spot resulting from loop 60 appears stationary, which indicates that the craft is on course, since the said receiving loop will be at right angles to the transmitter or in a non-receptive position. The right-hand spot will then appear on the screen to the right of the scale as a green line running parallel to the scale, starting at the center and extending upward to a distance which will be controlled by the attenuator or variable resistance 72. The correct length of this signal measuring line should be such that it extends from the spot center 71 to the scale zero 73. The scale 66, it will be noted, reads in reverse from the spot center; that is, the longer the signal measuring line reaching from the center toward the end of the scale, the less the distance from the plane to the transmitter, as marked on the scale, which brings the zero 73 at the far end of the scale from the spot center.

When it is desired to take a distance reading, the switch or reading button 67, for example, is depressed, thereby exchanging the non-directional antenna 68 for the directional loop 61. The signal line will then increase to a length determined by the strength of the signal received by said loop 61, but it will always start from the center zero and the end of the line will be opposite the figure on the scale which indicates the distance in miles. The length of the signal line then depends on the angle of the receiving loop 61 as regards the transmitter 12. If the loop is nearly at right angles to the path of reception, the line will be comparatively short, indicating great distance. If the plane of the loop is nearly in line with the path of reception, the signal line will be long, indicating close proximity to the transmitter. This is so because at close range the direction-indicating loop 60 controlling the left-hand spot will be at zero reception position for one transmitter 11 of the group while the distance-determining loop 61 controlling the right-hand spot will have its plane nearly in line with the path of reception from transmitter 12 and therefore receive a strong impulse to deflect the right-hand spot toward the end of the scale, which, because the scale reads in reverse, will be marked zero.

As the attenuator is always used to reduce or increase the antenna-ground reception signal line to a predetermined value, i. e., the zero on the scale, the value of the directional loop signal will always be proportional to the angle of reception of the loop 61, and not merely to the amplitude of the signal.

A rectifier 74 allows the spot to be deflected in one direction only, from the center of the scale, and the resistance 75 and shunt capacity 76 in circuit therewith determine the moment of inertia of the spot, that is, they have a "loading" effect upon it, tending to make it sluggish or rapid in motion.

The larger the shunt capacity 76, the more slowly the line moves, until a point is reached where the line appears broken up and finally disappears, leaving only the spot visible. The spot appears to jump from zero to a position opposite the scale where it remains stationary as long as the signal persists, when it drops back to zero. When atmospherics are strong, it is advantageous to use this "jumping spot" instead of the line for reading the value of distance on the scale.

A variable tuning condenser 80 is associated with the loop and antenna-ground system receiver for use with either the loop or the antenna system, while the variable resistance 72 or attenuator is provided beyond the receiver for varying its output. For the loop 60, a variable tuning condenser 81 is provided.

Output transformers 82 and 83 feed signal energy to the deflecting plates of respective cathode ray tubes 62 and 63, through corresponding rectifiers 84 and 74 and resistances 85 and 75 shunted by respective capacities 86 and 76.

For the two tubes, sources of alternating current 90 and 91 supply alternating current to the primary winding of transformers 92 and 93, which are enclosed as shown in respective grounded metal casings 94 and 95 in which are located safety resistances 96, 96' and 97, 97' and in series with the output terminals of the transformer. Rectifiers 98 and 99, which may conveniently be thermionic, are connected in the transformer output circuits and to filter condensers 100 and 101 within grounded casings having the terminals 102 and 103. There are provided, also, safety resistances 104, 105 and 106, 107 in series with the input terminals 102, 103, and resistances 104', 105' and 106', 107' in series with the output terminals of the filter condenser, across which latter resistances a surge-preventing resistor 108 and a resistor 109 are respectively connected. All resistances of a group are within the corresponding grounded casing.

To a second anode 110 of the cathode ray tube 63 is connected the filter condenser 100 which supplies high-tension current, while a medium-tension current is supplied to anode No. 1 of said tube from the source 111. The biasing battery of the same tube is indicated at 112, said tube having the control grid 113, the filament 114, and the filament battery 115.

The other half or tube 62 of the distance indicator is similarly constituted, being connected similarly to the direction-finding receiving loop 60 similar to loop 61, but tuned to transmitter 11 by the variable condenser 81.

To prevent the high voltage of the second anode of the cathode ray tubes from being dangerous to the operator from shock, a safety circuit transformer and filter are used. Thus, in the case of the transformers 92 and 93, the resistances 96, 96' and the resistances 97, 97' prevent a dangerous current from passing outside the grounded casing, while permitting sufficient current to pass to charge the filter condensers 100 and 101. The resistances 108 and 109 within the casings of the condensers are of the order of one megohm and prevent a condenser from storing up a heavy charge, by allowing it to leak slowly through this resistance.

The resistances 104, 105, 104', 105' and 106, 107, 106', 107' are of the order 20,000 ohms, and prevent a dangerous current from passing outside the grounded casing of the condenser while permitting sufficient current to pass to operate the tube, usually 5 or 6 mils.

It will be noted that there are separate input and separate output terminals to the filter condenser, allowing it to be charged at a slightly greater rate than it discharges, thereby maintaining an even flow of current to the second anode.

It will also be seen that no matter what conductors in the circuit may be accidentally contacted, only an extremely small current can be drawn from the transformer or condenser, as the peak voltage immediately drops to a harmless value as it cannot be maintained through the protective high impedances when accidentally short-circuited.

It is apparent that many other forms of my distance-determining system may be used without departing from the scope of the appended claims. For example, instead of using one homing compass system such as described in the said Bulletin No. 18, U. S. Department of Commerce, and one direct-reading compass, I may use any two similar systems, which show a "left-right" indication, by employing one system for establishing a reference point, and by comparing the direction indication of the other in amplitude of signal calibrated in terms of distance.

For example, there may be utilized the type in which a non-directive antenna is alternately connected to one half of a split loop by means of thermionic switching. Examples of this type are the "Lear" and "Kruse" compass. In compasses of this type the loop effect of the system is combined with the antenna effect through alternate biasing of a grid of a thermionic tube by predetermined voltages received from a local oscillator. These compasses are commonly employed as homing compasses in the U. S. Aviation Service. Such types are, however, very inaccurate for direct reading when off course because of amplitude indications. The prime requisite is that one half of the system shall register "on course" for one beacon and the other half simultaneously registers the amount of "off course" from another beacon, the difference being visually represented and calibrated in terms of units of distance.

I claim:

1. In a system for measuring the distance of a mobile unit from a given point, the combination with a unit for transmitting electromagnetic waves comprising triangularly disposed radio transmitters, and means to cause all of the transmitters to radiate individually signals during a period of measurement as waves of different frequencies, respectively; of two receiver means on a mobile unit each including fixed direction-finding means all being located in the same plane, and means respectively connected therewith to tune the same respectively to selected waves from any two of the transmitters and to the remaining transmitter for directional sense of approach, one receiver means being adapted to function as a minimum signal indicator and the other receiver means being adapted to then afford a relatively maximum signal indication, translation means operatively associated with the respective receiver means, and means actuated from the translation means for affording visual indications of the relative signal strength of the received waves, the difference between said indications being a measure of the distance of the mobile unit from one of the transmitters.

2. In a system for measuring the distance of a mobile unit from a given point, the combination with a unit for transmitting electromagnetic waves comprising triangularly disposed radio transmitters, and means to cause all of the transmitters to radiate individually signals during a period of measurement as waves of different frequencies, respectively; of two receiver means on a mobile unit each including fixed direction-finding means all being located in the same plane, and means respectively connected therewith to tune the same respectively to selected waves from any two of the transmitters and to the remaining transmitter for directional sense of approach, one receiver means being adapted to function as a minimum signal indicator and the other receiver means being adapted to then afford a relatively maximum signal indication, translation means operatively associated with the respective receiver means, a scale and means actuated from the translation means for affording therewith visual measurements of the relative signal strength of the received waves, the difference between said indications being a measure of the distance of the mobile unit from one of the transmitters, and means for maintaining said maximum signal indications in juxtaposition to the said scale.

3. In a system for measuring the distance of a mobile unit from a given point, the combination with a unit for transmitting electromagnetic waves comprising triangularly disposed radio transmitters, and means to cause all of the transmitters to radiate individually signals during a period of measurement as waves of different frequencies, respectively; of two receiver means on a mobile unit each including two fixed and differentially connected direction-finding elements all being located in the same plane, and means respectively connected therewith to tune the elements respectively to selected waves from any two of the transmitters and to the remaining transmitter for directional sense of approach, one receiver means being adapted to function as a minimum signal indicator and the other receiver means being adapted to then afford a relatively maximum signal indication, translation means operatively associated with the respective receiver means, and means actuated from the translation means for affording visual indications of the relative signal strength of the received waves, the difference between said indications being a measure of the distance of the mobile unit from one of the transmitters.

4. In a system for measuring the distance of a mobile unit from a given point, the combination with a unit for transmitting electromagnetic waves comprising more than two circularly disposed, equally spaced radio transmitters, and means to cause all of the transmitters to radiate individually signals during a period of measurement as waves of different frequencies, respectively; of two receiver means on a mobile unit each including two fixed loop receiver elements all being located in the same plane, said elements including two separate loop circuits differentially responsive as to direction, means to tune the receiver means respectively to selected waves from any two of the transmitters and to another transmitter for directional sense of approach, one receiver means being adapted to function as a minimum signal indicator and the other receiver means being adapted to then afford a relatively maximum signal indication, translation means operatively associated with the respective receiver elements, and means actuated from the translation means for affording visual indications of the relative signal strength of the received waves, the difference between said indications being a measure of the distance of the mobile unit from one of the transmitters.

5. In a system for measuring the distance of a mobile unit from a given point, the combination with a unit for transmitting electromagnetic waves comprising a group of three radio transmitters arranged in spaced relationship to form substantially an equilateral triangle, and means to cause all of the transmitters to radiate individually signals during a period of measurement as waves of different frequencies, respectively; of two receiver means on a mobile unit each including two fixed loop receiver elements all being located in the same plane, said elements including two separate loop circuits differentially responsive as to direction, means to tune the receiver means respectively to selected waves from any two of the transmitters and to the remaining transmitter for directional sense of approach, one receiver means being adapted to function as a minimum signal indicator and the other receiver means being adapted to then afford a relatively maximum signal indication, translation means operatively associated with the respective receiver elements, and means actuated from the translation means for affording visual indications of the relative signal strength of the received waves, the difference between said indications being a measure of the distance of the mobile unit from one of the transmitters.

6. In a system for measuring the distance of a mobile unit from a given point, the combination with a unit for transmitting electromagnetic waves comprising triangularly disposed radio transmitters, and means to cause all of the transmitters to radiate individually signals during a period of measurement as waves of different frequencies, respectively; of two receiver means on a mobile unit each including direction-finding means all having like reception angles with respect to the longitudinal axis of the mobile unit, and means respectively connected therewith to tune the same respectively to selected waves from any two of the transmitters and to the remaining transmitter for directional sense of approach, one receiver means being adapted to function as a minimum signal indicator and the other receiver means being adapted to then afford a relatively maximum signal indication, translation means operatively associated with the respective receiver means, and means actuated from the translation means for affording visual indications of the relative signal strength of the received waves, the difference between said indications being a measure of the distance of the mobile unit from one of the transmitters.

EDWARD G. GAGE.